United States Patent [19]
Higdon et al.

[11] Patent Number: 6,004,065
[45] Date of Patent: Dec. 21, 1999

[54] LOCKING CLIP SYSTEM FOR SECURING PANELS TOGETHER

[75] Inventors: Dale B. Higdon, Davenport; Brad J. Addink, Muscatine, both of Iowa

[73] Assignee: HON Technology Inc., Muscatine, Iowa

[21] Appl. No.: 08/822,337

[22] Filed: Feb. 4, 1998

[51] Int. Cl.⁶ ..................................................... B25G 3/36
[52] U.S. Cl. ........................ 403/384; 403/350; 403/353; 403/406.1; 411/104; 411/175; 411/553; 24/458; 108/108; 108/152
[58] Field of Search ................................. 403/353, 348, 403/350, 384, 406.1; 24/458, 588, 590; 411/104, 174, 175, 552, 553, 549; 312/140, 111; 108/108, 109, 152, 157

[56] References Cited

U.S. PATENT DOCUMENTS

| | | | |
|---|---|---|---|
| 2,334,681 | 11/1943 | Murphy | 411/553 X |
| 2,341,575 | 2/1944 | Segal | 411/553 |
| 2,407,618 | 9/1946 | Segal | 411/553 |
| 2,566,886 | 9/1951 | Hartman . | |
| 2,621,357 | 12/1952 | Stuman | 403/353 X |
| 2,709,390 | 5/1955 | Smith . | |
| 2,769,333 | 11/1956 | Reintjes . | |
| 2,934,684 | 4/1960 | Fegan . | |
| 3,178,987 | 4/1965 | Reese et al. . | |
| 3,894,377 | 7/1975 | Welch | 403/353 X |
| 3,986,318 | 10/1976 | McConnell | 403/384 |
| 4,601,247 | 7/1986 | Welch et al. . | |
| 4,643,610 | 2/1987 | Bien | 411/175 X |
| 4,786,119 | 11/1988 | Smuda | 312/195 |
| 4,802,802 | 2/1989 | Thurner . | |
| 5,098,765 | 3/1992 | Bien | 411/104 X |
| 5,114,203 | 5/1992 | Carnes | 411/104 X |
| 5,118,234 | 6/1992 | Norkus | 411/175 X |
| 5,167,465 | 12/1992 | Inui et al. | 403/348 X |
| 5,738,462 | 4/1998 | Petersen et al. | 403/353 |
| 5,839,173 | 11/1998 | Otrusina | 24/590 X |

FOREIGN PATENT DOCUMENTS 391764  10/1990  European Pat. Off. ............... 411/104

*Primary Examiner*—Daniel P. Stodola
*Assistant Examiner*—Bruce A. Lev
*Attorney, Agent, or Firm*—Jones, Day, Reavis & Pogue

[57] ABSTRACT

A system for interlocking together two panel members comprises a washer member having a first washer portion connected by a first necked down portion to a second intermediate washer portion and a third washer portion connected by a second necked down portion to the second intermediate washer portion. A bore runs through the washer member for receiving a screw for fastening the washer member to a side of a first panel member. A second panel member has a keyhole slot and an aperture spaced from the keyhole slot. A resilient clip member has one end formed with a right angle projecting portion and a second end formed with an aperture configured to securely receive the first necked down portion of the washer member. When the washer member is fastened together with the clip member to a side of the first panel member, the third washer portion may be inserted into the keyhole slot and the first panel member may be moved such that the second necked down portion slides into a reduced opening portion of the keyhole slot, whereupon the projecting portion of the clip member is resiliently biased into the aperture of the second panel member thereby immovably securing the panel members together.

6 Claims, 3 Drawing Sheets

6,004,065

1

LOCKING CLIP SYSTEM FOR SECURING PANELS TOGETHER

BACKGROUND OF THE INVENTION

1. Field of the Invention

The present invention relates generally to a locking clip system for removably securing panels together and more particularly, to a locking clip which may be used advantageously for removably securing a desk top to a cabinet pedestal such that the top and pedestal may be conveniently assembled or disassembled.

2. Description of the Prior Art

In the construction of office furniture or the like, it is common to find desks assembled from a desk top panel having pedestals secured to its underside. The pedestals are often constructed of sheet metal and are provided with suitable drawers for filing documents or storing office supplies. The desk top may be fabricated from a variety of materials but is often a composite structure having a wood or wood-like appearance.

Because desks are often large bulky items, it is frequently desired to ship them to their ultimate destinations in disassembled form for assembly on site. In such case, a desk comprising pedestals and a desk top surface is usually assembled by fastening the pedestals to the desk top surface using screws or the like. However, such assembly can be a time consuming process involving the use of tools such as drills, wrenches, and screwdrivers. In recent times, it has been found desirable to secure the desk top surface to the pedestals using locking clip systems. One such locking clip system is disclosed, for example, in U.S. Pat. No. 4,786,119, issued to Smuda. In the Smuda arrangement, special bolts having conical heads are screwed into the undersurface of the desk top at the corners thereof. An upper surface of the pedestal is provided with keyhole slots corresponding to the number of locations of the bolts such that the heads of the bolts may be inserted into the keyhole slots. Once inserted into the slots, an aperture of a resilient clip engages the conical head of each bolt and retains the bolts in locked position in the slots. An advantage of such a clip system is that the desk top may be conveniently installed on the pedestals on site without the need for any tools. Likewise, the desk can be readily disassembled without tools by simply releasing the locking clips manually whereupon the top can be removed.

Although the locking clip system of the aforesaid Smuda patent provides a convenient means for desk assembly, it is desirable to improve that system from the standpoint of simplicity and consequent manufacturing cost. For example, in the Smuda system, the locking clip must be fastened to the pedestal by such means as rivets or by welding. Moreover, the bolt is an intricate member requiring several machining processes. Accordingly, it is desirable to provide an improved locking clip system comprising few simple parts and which are easily assembled in manufacture.

SUMMARY OF THE INVENTION

The present invention improves over the prior art by providing a system for interlocking together two panel members comprising a washer member having a first washer portion connected by a first necked down portion to a second intermediate washer portion and a third washer portion connected by a second necked down portion to the second intermediate washer portion. A bore runs through the washer member for receiving a screw for fastening the washer

2 member to a side of a first panel member. A second panel member has a keyhole slot and an aperture spaced from the keyhole slot. A resilient clip member has one end formed with a right angle projecting portion and a second end formed with an aperture configured to securely receive the first necked down portion of the washer member. When the washer member is fastened together with the clip member to a side of the first panel member, the third washer portion may be inserted into the keyhole slot and the first panel member may be moved such that the second necked down portion slides into a reduced opening portion of the keyhole slot, whereupon the projecting portion of the clip member is resiliently biased into the aperture of the second panel member thereby immovably securing the panel members together.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENT

Figure 1:
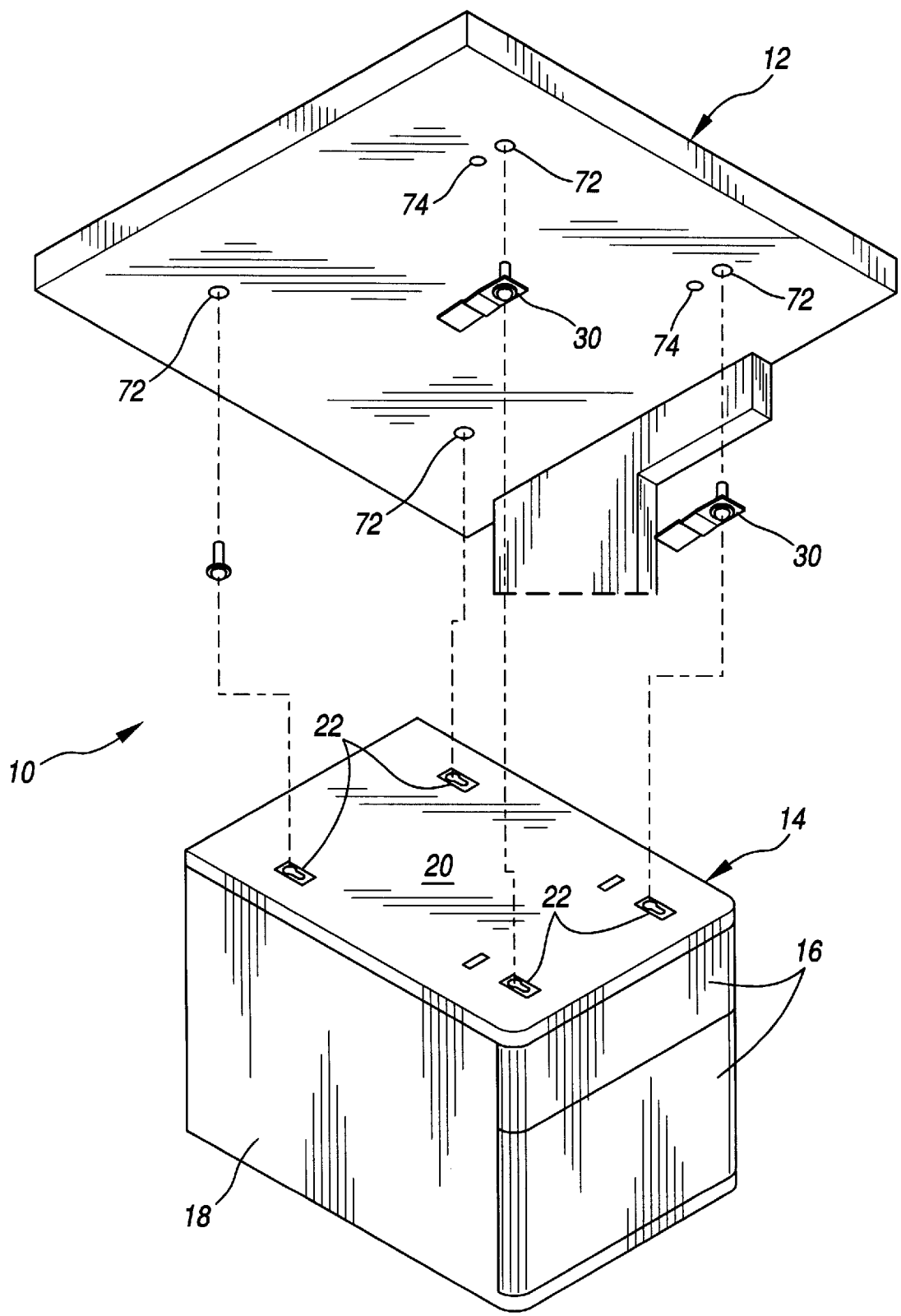
FIG. 1 is a partial exploded isometric view of a desk assembly using a system in accordance with the invention for interlocking the desk top to a base pedestal.

Referring now to the drawings, and initially to FIG. 1, a desk assembly, designated generally by the reference numeral 10 and shown only partially, includes a generally planar desk top 12 and a base pedestal 14. The base pedestal 14 may be constructed of suitable sheet metal having drawers 16 slidable from a front face thereof. The pedestal 14 defines an enclosure having sidewalls 18, only one of which can be seen, and a connecting top surface 20. The top surface 20 in accordance with the invention is formed at its corners with keyhole slots 22. The desk top 12 may be formed from wood or a composite material. A pair of clip assemblies 30, in accordance with the invention, are fastened to the underside of the desk top in registry with the two forward-most keyhole slots 22 of the top surface 20 of the pedestal 14.

Figure 2:
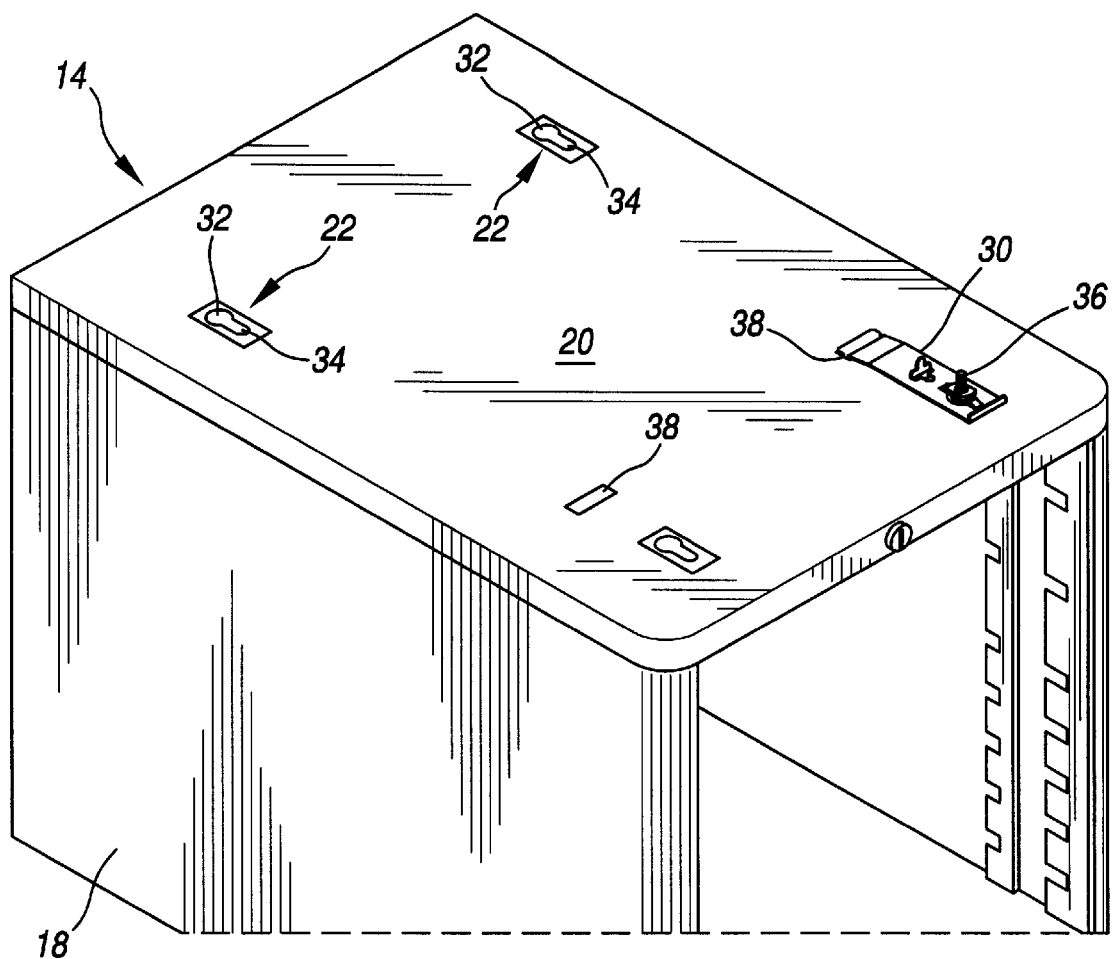
FIG. 2 is a partial perspective view of a base pedestal constructed in accordance with the invention.

FIG. 2 shows an enlarged view of the top surface 20 of the pedestal 14 wherein the four keyhole slots 22 can be seen to have an enlarged opening portion 32 and a reduced size opening portion 34. A clip assembly 30 is shown fitted in one of the keyhole slots 22 and provided with a bolt or screw 36 for fastening the assembly 30 to the underside of the desk top 12. In accordance with the invention, the surface 20 is provided with a pair of generally rectangular slots, or apertures 38, each spaced rearwardly from one of the forward two keyhole slots 22.

Figure 3:
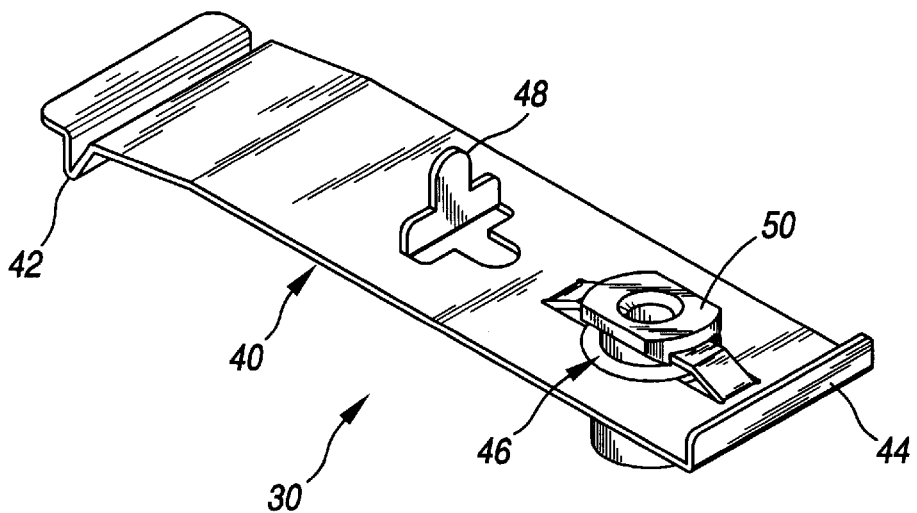
FIG. 3 is a perspective view of clip member and washer assembly constructed in accordance with the invention.
Figure 4:
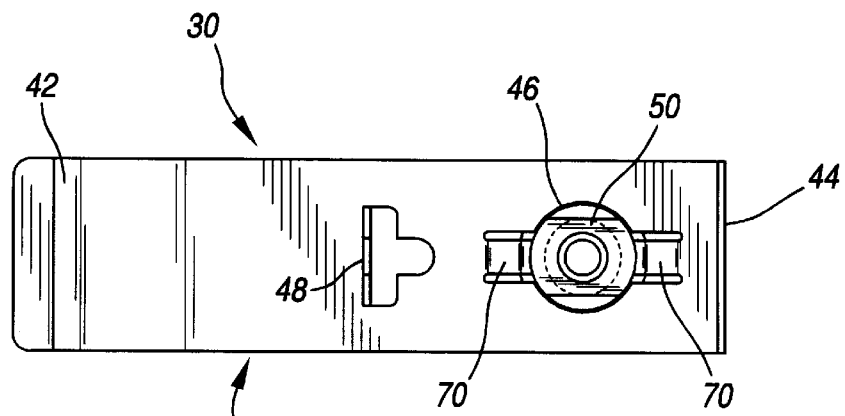
FIG. 4 is a top plan view of the clip member and washer assembly.
Figure 5:
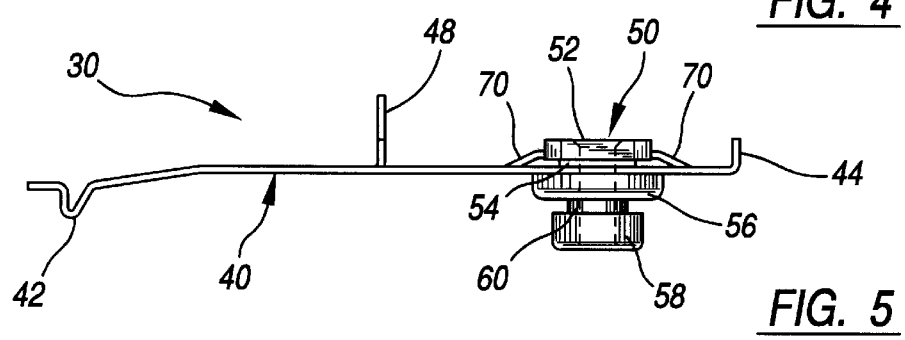
FIG. 5 is a side elevational view of the clip member and washer assembly.

In FIGS. 3–5, the details of the clip assembly 30 can be seen. The assembly 30 includes a generally elongated clip member 40 preferably constructed of a suitable resilient spring steel. One end of the clip member 40 is formed with a transverse projecting portion 42 extending downwardly generally at right angles to the body of the clip member 40. The opposite end of the clip member 40 is provided with a right angle bent flange portion 44 serving as a spacer. The clip member 40 is also provided with a generally circular aperture 46 adjacent to the flange portion 44. Centrally of the clip member 40 is an upstanding generally right angle bent tab portion 48, the purpose of which will be described hereinafter.

Figure 6:
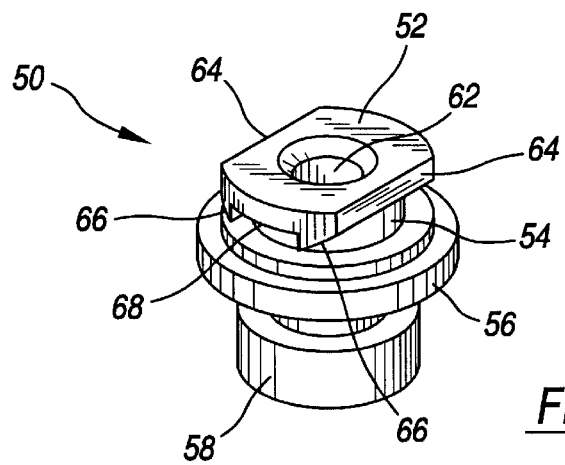
FIG. 6 is a top perspective view of the washer member.
Figure 7:
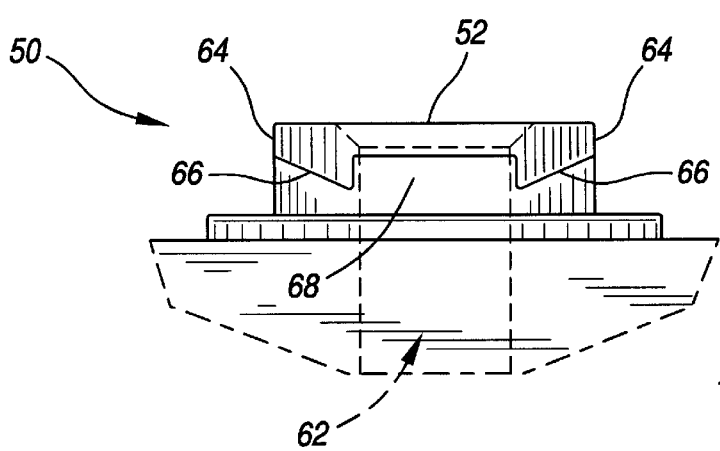
FIG. 7 is a partial side elevational view of the washer member.

Fitted in the aperture 46 is a washer member 50. As best seen in FIGS. 5–7, the washer member 50 is formed with a first washer portion 52 connected by a first necked down portion 54 to a second washer portion 56. A third washer portion 58 is connected by a second necked down portion 60 to the second washer portion 56. A through bore 62 runs axially through the washer member 50 to slidingly receive a screw 36 for fastening the washer member 50 to the desk top 12.

FIGS. 6 and 7 illustrate in detail the construction of the first washer portion 52. The first washer portion 52 is generally circular but is formed with a pair of opposed flats 64. Further, the rounded portions of the portion 52 are provided with downwardly projecting ramp surfaces 66 which define recesses 68 in the underside of the portion 52. From FIGS. 4 and 5, it can be seen that the clip member 40 is formed with a pair of upwardly inclined tabs 70. In practice, the washer member 50 is assembled to the clip member 40 by inserting the first washer portion 52 through the clip member aperture 46 such that the flats 64 are aligned with and clear the tabs 70. The second washer portion 56 is slightly larger in diameter than the aperture 46, and once the second washer portion 56 abuts the underside of the clip member 40, the washer member 50 is rotated through ninety degrees such that the tabs 70 pass over the ramp surfaces 66 and become seated in the recesses 68. Thus the washer member 50 is securely fastened to the clip member 40.

It can now be appreciated that a system in accordance with the invention provides a highly effective means for locking together two panel members such that the panel members may be conveniently assembled together, particularly in field assembly applications. As best seen in FIG. 1, the desk top 12 may be manufactured with six predrilled holes 72 and 74. A pair of washer members 50 may simply be fastened by screws 36 threaded into the two rearward-most holes 72, while clip assemblies 30, including preassembled clip members 40 and washer members 50 may be fastened with screws 36 threaded into the forward-most holes 72. As the clip assemblies 30 are fastened, the tab portions 48 can be inserted into the holes 74 whereupon the assemblies 30 will be properly aligned without tedious trial and error adjustment. Once the assemblies 30 are fastened to the desk top 12, the top 12 may simply be aligned on top of the pedestal 14 such that the third washer portions 58 of the washer members 50 pass through the enlarged opening portions 34 of the four keyhole slots 22. Because the second washer portions 56 of the washer members 50 are preferably larger in diameter than the diameters of the opening portions 34, the washer portions 56 will come to rest on the upper surface 20 of the pedestal 14 with the second necked down portions 60 of the washer members 50 in alignment with the reduced size openings 34 of the keyhole slots 22. Then, the pedestal may simply be manually pushed to the rear, as viewed in FIG. 1, whereupon the washer members 50 become securely seated in the smaller opening portions 34 of the keyhole slots 22. As this seating takes place, the projecting portions 42 of the clip members 40 will drop into the apertures 38 of the surface 20 and the top 12 and pedestal 14 will be securely connected to one another. When it is desired to disassemble the pedestal 14 from the top 12, the projecting portions 42 of the clip members 40 may simply be forced out of the apertures 38. It can thus be seen that the system in accordance with the invention provides for simplicity in manufacture and ease in the field assembly of such products as desks, or the like, and may also be readily used to join a variety of other panel assembly structures.

While the invention has been described in connection with a preferred embodiment thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. An interlocking panel system comprising:

a first panel member;

a washer member having a first washer portion connected by a first necked down portion to a second washer portion and a third washer portion connected by a second necked down portion to said second washer portion, said washer member having a continuous bore running therethrough to receive a fastener for fastening said washer member to a side of said first panel member;

a second panel member having a keyhole slot formed therein, said slot having an enlarged opening portion leading to a reduced opening portion, said reduced opening portion being smaller in size than said third washer portion and larger in size than said second necked down portion of said washer member, said second panel member further having an aperture spaced from said keyhole slot;

a generally elongate, resilient clip member having a longitudinal axis and having a first end formed with a first projecting portion projecting generally at right angles to said longitudinal axis, said clip member further having a second end opposed from said first end, said second end being provided with an aperture, said aperture of said second end being dimensioned and configured to fixedly receive the first necked down portion of said washer member to attach said washer member to said clip member;

wherein when said washer member is fastened together with said clip member to a side of said first panel member, said third washer portion may be inserted through said enlarged opening portion of the keyhole slot of the second panel member and said first panel member may be moved such that said second necked down portion slides into said reduced opening portion of said keyhole slot whereupon said first projecting portion of said clip is resiliently biased into said aperture of said second panel member thereby immovably securing said panel members together.

2. The system of claim 1 wherein said clip member includes a second projecting portion projecting generally in a direction opposite that of said first projecting portion and said second projecting portion is receivable by an aperture in said first panel member.

3. The system of claim 1 including at least two tabs projecting into said aperture of said clip member for engaging said first necked down portion of said washer member.

4. The system of claim 3 wherein said first washer portion includes recesses for receiving said tabs.

5. The system of claim 4 wherein said first washer portion includes ramp surfaces defining said recesses.

6. The system of claim 1 wherein said first washer portion of said washer member is provided with a pair of opposed flat edges and said washer member is secured to said clip member by inserting said first washer portion through said clip member aperture and turning said washer member ninety degrees relative to said clip member.

* * * * *